Dec. 13, 1938.  C. J. WHITACRE  2,140,123
BRAKING MECHANISM
Filed Jan. 23, 1937   2 Sheets-Sheet 1
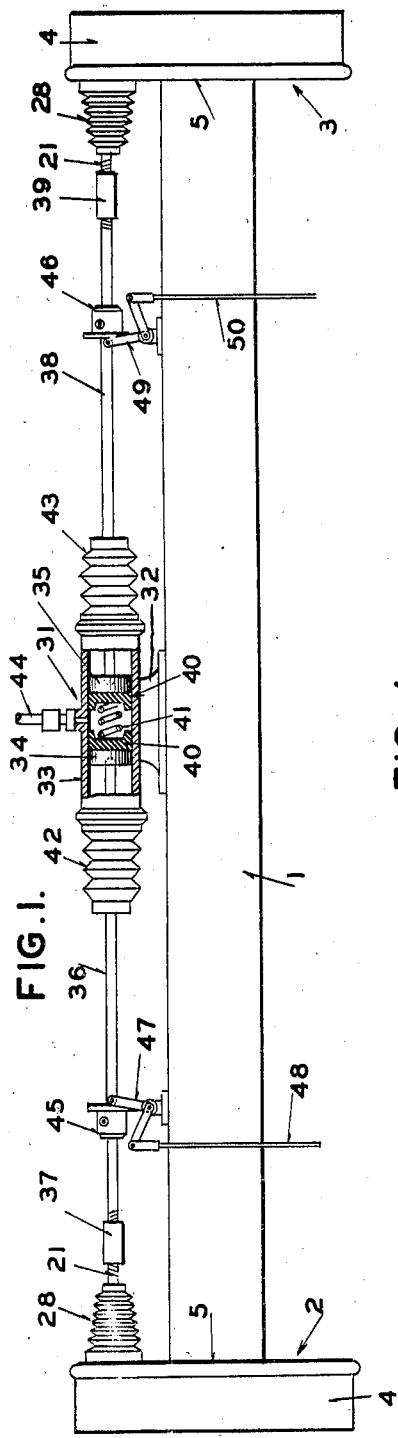
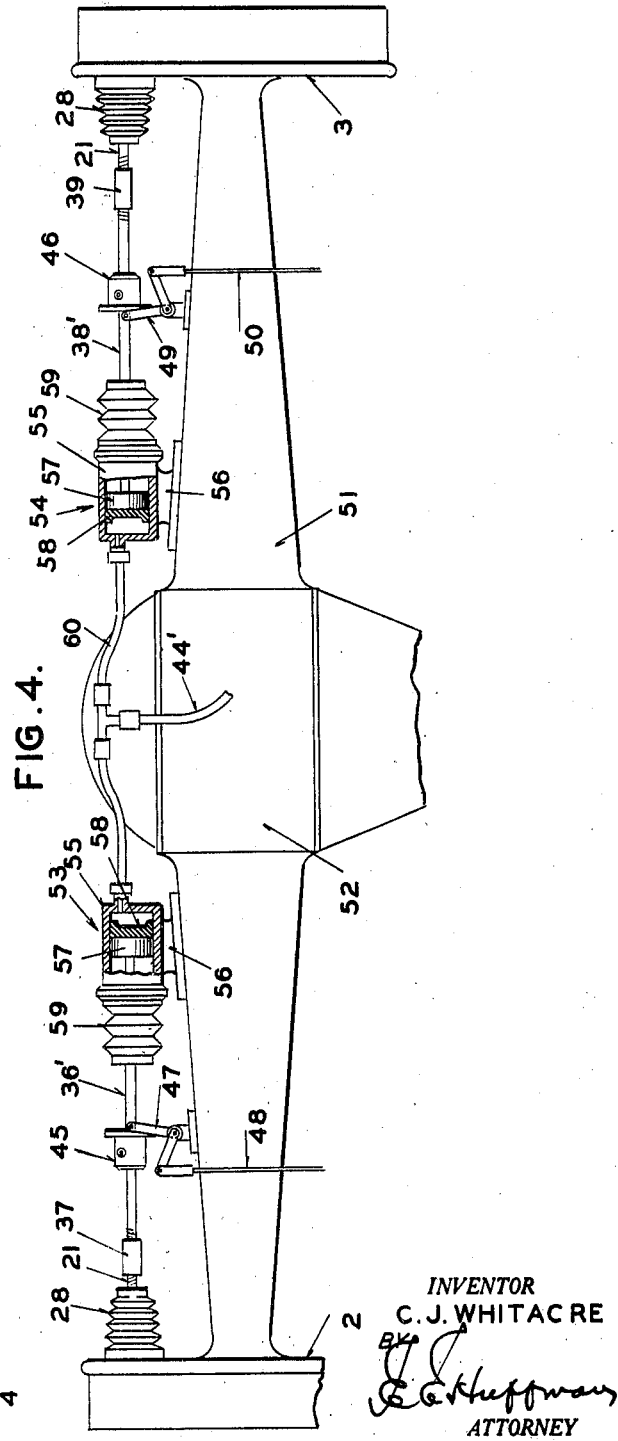
INVENTOR
C. J. WHITACRE
BY
ATTORNEY Dec. 13, 1938.  C. J. WHITACRE  2,140,123
BRAKING MECHANISM
Filed Jan. 23, 1937  2 Sheets-Sheet 2
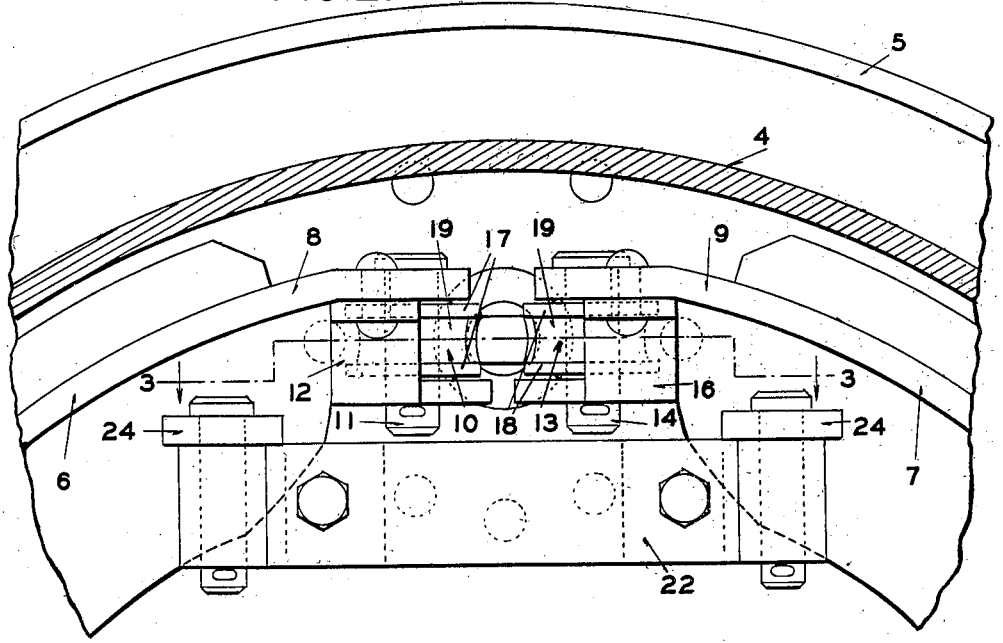
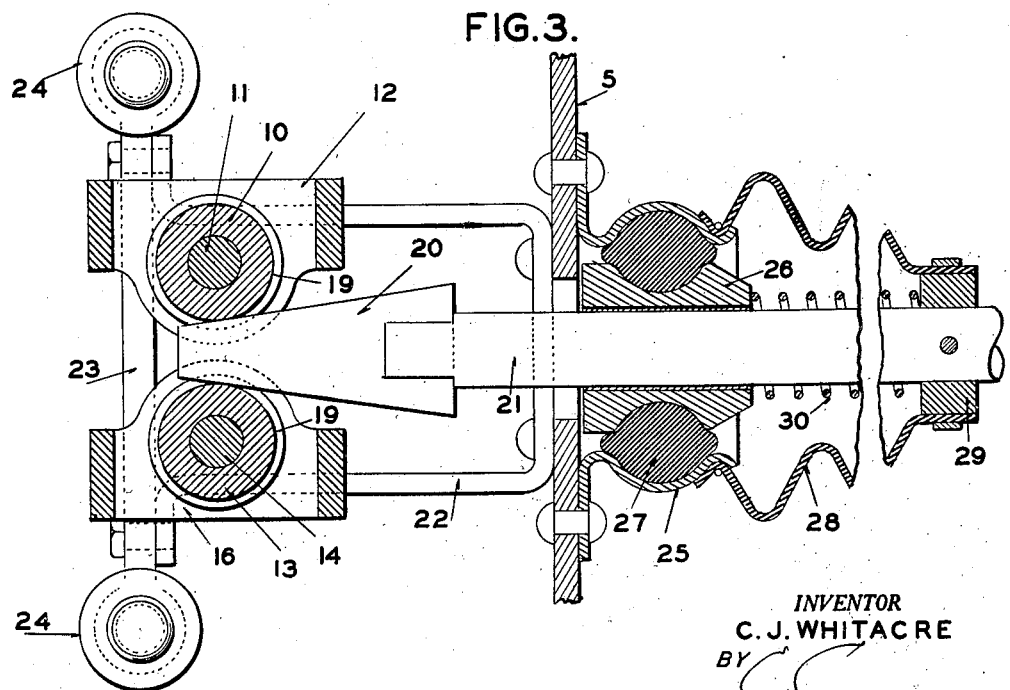
INVENTOR
C. J. WHITACRE
BY
ATTORNEY Patented Dec. 13, 1938

2,140,123

UNITED STATES PATENT OFFICE 2,140,123

BRAKING MECHANISM

Clarence J. Whitacre, St. Louis, Mo., assignor to Wagner Electric Corporation, St. Louis, Mo., a corporation of Delaware Application January 23, 1937, Serial No. 122,034

6 Claims. (Cl. 188—152)

My invention relates to a brake actuating mechanism and more particularly to a mechanism whereby a pair of separate brakes may be applied with equal pressure.

One of the objects of my invention is to provide a simple and efficient brake actuating mechanism for applying with equal pressure two spaced apart brakes employed on axially aligned rotatable members.

Another object of my invention is to provide a brake actuating mechanism for controlling the brakes on a truck or trailer and which may be quickly and economically installed either in the field or as original equipment.

Still another object is to provide a brake actuating mechanism that may be operated either by fluid motor or a manually operable pull rod.

A more specific object of my invention is to actuate a pair of spaced apart brake assemblies by means of two aligned longitudinally slidable rods interposed between the brakes and having brake operating wedges at their outer ends and fluid motors positioned at their inner ends.

Other objects of my invention become apparent from the following description taken in connection with the accompanying drawings in which Figure 1 is a top view of a dead axle showing my novel brake actuating mehanism mounted thereon for operating the brakes of the wheels at the ends of the axle; Figure 2 is an end view of the wedging means employed to expand the brake shoes; Figure 3 is a cross-sectional view on the line 3—3 of Figure 2; and Figure 4 is a view of a modified structure showing the actuating mechanism mounted on a live axle.

Referring to Figures 1, 2, and 3, the dead axle 1 has mounted upon its ends in the usual manner brake assemblies 2 and 3, each comprising a brake drum 4, a backing plate 5, and a friction device shown as a pair of shoes 6 and 7 for cooperation with the drum, the shoes having adjacent ends 8 and 9 and being pivotally supported on the backing plate. The drum 4 is adapted to be attached to a vehicle wheel (not shown) for rotation therewith and the backing plate, which encloses the drum, is rigidly secured to the end of the axle.

Since the brake expanding structure for each friction device is identical, the one employed with brake assembly 2 will be described in detail. The end 8 of shoe 6 carries a roller 10 rotatably mounted upon a pin 11 extending through the lining carrying flange of shoe 6 and a suitable bracket 12 riveted to the under side of said flange. The end 9 of the friction device also carries a roller 13 rotatably mounted upon a pin 14 extending through the lining carrying flange of shoe 7 and a bracket 16 riveted to the under side of said flange. The rollers 10 and 13 are provided with enlarged end portions 17 and 18 in order to provide concave grooves 19 in their peripheral surfaces. A wedge 20 is positioned between the rollers and lies in grooves 19, the sides of the wedge having a slightly convex surface so as to fully contact with the surfaces of the grooves. This wedge is secured to and carried by the end of a reciprocable rod 21 which is adapted to extend through an enlarged opening in backing plate 5 of the brake assembly. A U-shaped bracket 22 is riveted to backing plate 3 and extends beneath the wedge and roller assembly, and carries a cross bar 23 upon the ends of which are rotatably mounted rollers 24. These rollers are positioned on the far side of the webs of shoes 6 and 7 and cooperate with these webs to form anti-friction abutments for preventing movement of the shoe ends with the wedge when the wedge is actuated to spread the shoes.

In order to provide a yieldable bearing for rod 21, backing plate 5 has riveted thereto a casing member 25. Surrounding the rod is a sleeve 26 and between this sleeve and the casing member is interposed a rubber ring 27. A dust excluding boot 28 is also provided between casing 25 and a shoulder 29 on the rod and interposed between this shoulder and the end of sleeve 26 is a coiled spring 30 which is adapted to act as a return spring for returning rod 21 and wedge 20 to their normal inactive position corresponding to the "off" position of the brake.

A fluid motor 31 is mounted upon the central portion of axle 1 by means of a suitable bracket 32 and this motor comprises a cylinder 33 and a pair of oppositely movable pistons 34 and 35. The piston 34 is connected to rod 21 of brake assembly 2 by a rod 36 and an adjusting turnbuckle 37, and piston 35 is connected to rod 21 of brake assembly 3 by a rod 38 and an adjusting turnbuckle 39. Each piston is provided with a suitable packing cup 40, and a light spring 41 is interposed between the two piston to maintain the cups in engagement with their respective piston heads. A dust excluding boot 42 is interposed between the cylinder and rod 36, and a dust excluding boot 43 is interposed between the cylinder and rod 38. A conduit 44 is attached to the cylinder wall and is in communication with the chambers between the two pistons, this conduit extending to a suitable source of fluid power as, for example, a fluid compressor or an air compressor tank.

In order to provide a manually operable mechanical actuation for each of the brakes by means of rods 36 and 38, rod 36 has mounted thereon an adjustable collar 45, and rod 38 has mounted thereon an adjustable collar 46. A bell crank lever 47 is pivotally mounted upon the axle adjacent the adjustable collar 45, one of its arms engaging the collar and its other arm being connected to a rod 48. A similar bell crank lever 49 is pivoted upon the axle adjacent the adjustable collar 46, one of its arms engaging collar 46 and its other arm being connected to a rod 50. The rods 48 and 50 are each connected to a suitable common actuating lever or pedal, as is well-known practice, whereby they may be moved simultaneously to move rods 36 and 38 in opposite directions.

Referring to the operation of the actuating mechanism just described, when it is desired to apply brake shoes 6 and 7 of each brake assembly to their cooperating drum by the fluid motor, fluid under pressure is forced into cylinder 33 through conduit 44. This causes pistons 34 and 35 to be moved in opposite directions and with equal force, thereby axially moving wedge 20 of each brake assembly. Actuation of these wedges results in the expansion of brake shoes 6 and 7 into engagement with the drum. The shoes are held from lateral movement during movement of each wedge by rollers 24. These rollers and rollers 10 and 13, cooperating with the wedge, reduce the friction between the engaging parts to a minimum. The rubber mounting of rod 21 permits the rod and wedge to shift with both shoes as they set themselves with the drum. When the fluid under pressure is released, spring 30 of each brake retracts the wedge and the shoes are disengaged from the drum by the usual retractile springs (not shown). To mechanically apply the brakes of brake assemblies 2 and 3, rods 48 and 40 are pulled by the single member and as a result thereof, bell crank levers 47 and 49 will move rods 36 and 38 axially in opposite directions in the same way as is done by the pistons of the fluid motor.

In the modification shown in Figure 4, I have disclosed the actuating mechanism installed on a vehicle having a live axle 51. Due to the differential housing 52, it is not possible to employ the single cylinder fluid motor and, therefore, this is replaced by two separate fluid motors 53 and 54. The motors 53 and 54 are of like construction and each comprises a cylinder 55 mounted upon the axle housing by a support 56 and slidable in the cylinder is a piston 57 having a packing 58. The open ends of the cylinders are closed by dust boots 59. The piston 57 of fluid motor 53 is connected to rod 36' which in turn is connected to wedge 20 of brake assembly 2 in a manner already described, and piston 57 of fluid motor 54 is connected to rod 38' which in turn is connected to wedge 20 of brake assembly 3. The fluid motors are connected for intercommunication by a conduit 60 and this conduit is connected to the source of pressure by conduit 44'. The mechanical actuating mechanism is the same as previously described.

The operation of this modification is the same as the one associated with the dead axle, pistons 57 of fluid motors 53 and 54 being moved in opposite directions with an equal force by means of fluid under pressure from conduit 44' connected to the source.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In braking apparatus for a vehicle having two spaced apart members rotatable on the same axis, a brake for each member, axially aligned rods in parallel relation with the axis of the members and positioned between the brakes, means carried by the outer end of each rod and adapted to actuate a brake upon longitudinal movement of the rod, fluid-operated means interposed between the inner ends of the rods for simultaneously moving them longitudinally in opposite directions to operate the brakes, and mechanically actuated means connected to each rod for moving the rods longitudinally in opposite directions independently of the fluid-operated means.

2. In braking apparatus for a vehicle having two spaced apart members rotatable on the same axis, a brake for each member, axially aligned rods in parallel relation with the axis of the members and positioned between the brakes, a wedge carried by the outer end of each rod adapted to actuate a brake when the rod is moved longitudinally, means for slidably supporting each rod upon the braking structure, said means embodying means permitting each rod to be laterally yieldable, and means interposed between the inner ends of the rods for simultaneously moving them longitudinally in opposite directions to operate the brakes, the inner ends of said rods being prevented by said last named means from lateral movement during longitudinal movement of the rods.

3. In braking mechanism, a support, a rotatable drum, a friction device adapted to engage the drum and having adjacent ends, anti-friction means mounted on each end of the friction device in opposed relation, a wedge interposed between the anti-friction means, a longitudinally movable rod connected to the wedge, a yieldable bearing for said rod carried by the support and permitting the rod to move laterally and longitudinally with respect to the support, spring means surrounding the rod and positioned between the bearing and an abutment on the rod for biasing the rod to a position corresponding to the inoperative position of the wedge, and means for moving the rod longitudinally to actuate the friction device by the wedge.

4. In braking mechanism, a support, a rotatable drum, a friction device adapted to engage the drum and having adjacent ends, anti-friction means mounted on each end of the friction device in opposed relation, a wedge interposed between the anti-friction means, a longitudinally movable rod connected to the wedge, a yieldable bearing for said rod carried by the support and permitting the rod to move laterally with respect to the support, spring means for biasing the rod to a position corresponding to the inoperative position of the wedge, means for moving the rod longitudinally to actuate the friction device by the wedge, and abutment means for preventing movement of the ends of the shoes in the axial direction of the wedge when said wedge is moved, said means comprising a roller mounted on the support and cooperating with each shoe end.

5. In braking mechanism, a support, a rotatable drum, a friction device adapted to engage the drum and having adjacent ends, a roller mounted on each end of the friction device in opposed relation, a wedge interposed between the antifriction means, a longitudinally movable rod connected to the wedge, a yieldable bearing for said rod carried by the support and permitting the rod to move laterally and longitudinally with respect to the support, spring means surrounding the rod and positioned between the bearing and an abutment on the rod for biasing the rod to a position corresponding to the inoperative position of the wedge, and a fluid motor comprising a cylinder for moving the rod longitudinally to actuate the friction device by the wedge.

6. In braking apparatus for a vehicle having two spaced apart drums rotatable on the same axis, a brake within each drum for cooperation therewith and comprising friction means having lining carrying portions with adjacent ends, a roller pivotally mounted on a fixed axis on the underside of each adjacent end of the lining carrying portions, said rollers on each friction means being in opposed relation, axially aligned rods in parallel relation with the axis of the drums and positioned between the drums, a wedge carried by the outer end of each rod and adapted to cooperate with said rollers, and fluid-operated means interposed between the inner ends of the rods for simultaneously moving them longitudinally in opposite directions to operate the brakes by said wedges, the inner ends of said rods being prevented from lateral movement by the fluid-operated means.

CLARENCE J. WHITACRE.